3,336,218
CATALYTIC HYDROFORMING PROCESS
Hugh P. Hebert, Princeton, and Seymour C. Schuman, Rocky Hill, N.J., assignors to Cities Service Oil Company, Bartlesville, Okla., a corporation of Delaware
Filed Jan. 3, 1966, Ser. No. 518,271
3 Claims. (Cl. 208—136)

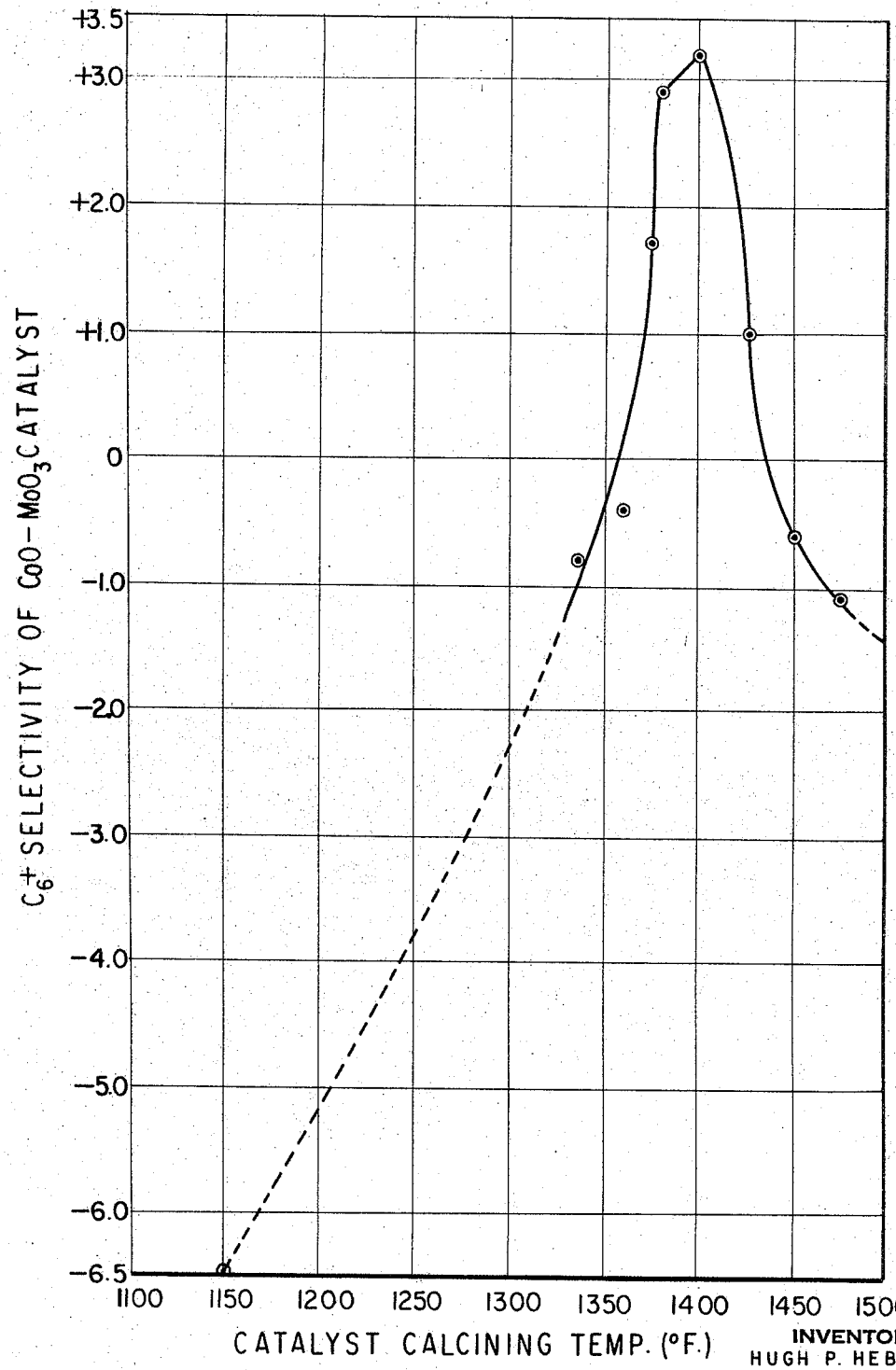

The present invention relates to catalytic hydroforming of liquid hydrocarbon fractions. More particularly, the invention enables improvements in catalytic hydroforming processes by employing a supported cobalt oxide-molybdenum oxide catalyst prepared in a critical manner.

The term "catalytic hydroforming" as used herein refers to processes of the type wherein a hydrocarbon fraction is subjected to treatment at high temperature and superatmospheric pressure in the presence of hydrogen gas and a suitable catalyst to provide a highly aromatized or otherwise chemically reconstructed product. The hydocarbon feedstock to the hydroforming process is preferably one boiling in the gasoline range, e.g. naphtha, whereby the product has a higher octane number. Thus, the term "catalytic hydroforming" connotes something more than mere purification of a hydrocarbon fraction, such as desulfurization. Accordingly, among the hydrocarbon conversion reactions which may occur to a greater or lesser extent during the hydroforming process are dehydrogenation of naphthenes, to aromatics, hydrocracking of higher boiling paraffins, isomerization of paraffins to products having a greater degree of chain branching, cyclization, and desulfurization.

It is known to employ catayst compositions of molybdenum oxide on a suitable support material, such as alumina, in the hydroforming of gasolene boiling range fractions. Further, it is known to employ supported cobalt oxide-molybdenum oxide catalysts to effect purification of hydrocarbon fractions, for example, hydrodesulfurization.

The present invention is predicated on the discovery that a supported cobalt oxide-molybdenum oxide composition prepared in a critical manner functions as a highly effective hydroforming catalyst. More particularly, the cobalt oxide-molybdenum oxide catalyst utilized in the practice of the present invention has a high activity, excellent stability and enables exceptionally outstanding yields of liquid hydrocarbon product containing at least 6 carbon atoms ($C_6+$ hydrocarbons) when reforming to a given octane level. Accordingly, the hydroforming process of the invention provides substantial economies by enabling the hydrocarbon feedstock to be hydroformed to a higher octane number at a given feed rate or at a higher feed rate at a given octane number.

The above and other advantages of the invention are obtained by subjecting a liquid hydrocarbon fraction to hydroforming conditions in the presence of a catalyst calcined at a temperature of 1375° F. to 1425° F. and consisting essentially of cobalt oxide and molybdenum oxide upon on alumina support.

The catalyst compositions contemplated by the present invention may be formed by a variety of methods. One suitable method, for example, involves impregnating a particulate absorbent alumina gel, which is preferably gamma-alumina, with solutions of cobaltous and molybdenum salts, and subsequently calcining the composition at a temperature of 1375° to 1425° F. The catalyst composition may also be prepared, for example, by coprecipitating alumina, $MoO_3$ and $CoO$, followed by calcining the composition at the above-noted temperature.

The weight ratio of $CoO$ to $MoO_3$ in the catalyst composition is preferably within the range of about 0.2 to about 0.4, while the sum of the weights of $CoO$ and $MoO_3$ is from 6% to 20% of the total weight of composition. Catalysts containing the stated amounts of $CoO$ and $MoO_3$ have significantly higher activity compared to a standard alumina-supported molybdenum oxide hydroforming catalyst. As used herein, "catalyst activity" is defined as the ratio of feedstock space velocity (weight of feed per hour per weight of catalyst) enabled by the $CoO$-$MoO_3$ hydroforming catalyst of this invention to the space velocity enabled by a standard 11% molbdenum oxide on alumina catalyst at a constant hydroforming temperature and product octane level. The higher activity catalysts utilized in the present hydroforming process enable significantly higher feedstock throughputs when hydroforming to a given octane number.

The sum of the weights of $CoO$ and $MoO_3$ in the catalyst composition also influence the activity of the catalyst composition. Accordingly, catalysts containing a total of at least 6% of cobalt oxide and molybdenum oxide have outstanding activity, although higher metal contents provide even higher activity. However, when the sum of the cobalt oxide and molybdenum oxide contents of the catalyst exceeds 20% by weight, the stability of the catalyst is deleteriously affected. Thus, regeneration of the catalyst containing such high cobalt oxide and molybdenum oxide contents results in a serious decrease in catalyst surface area.

In general, $CoO:MoO_3$ weight ratios above the range indicated above increase the yield of undesirable methane from the hydroforming process, while decreasing the yield of desirable $C_6+$ liquids, i.e. liquid hydrocarbons of at least 6 carbon atoms. On the other hand, $CoO:MoO_3$ ratios below the indicated range also decrease $C_6+$ liquid yield, while increasing the formation of undesirable coke products.

Catalyst having the best combination of activity, stability and $C_6+$ selectivity are those wherein the $$CoO:MoO_3$$

weight ratio is 0.27 to 0.29 and the sum of the weights of $CoO$ and $MoO_3$ is from 9% to 17% by weight of the total weight of the composition.

The temperature at which the lumina-cobalt oxide-molybdenum oxide catalyst composition is calcined is an essential feature of the present invention. Thus, we have found that $CoO$-$MoO_3$ catalysts calcined at a temperature within the range of 1375° F. to 1425° F., and preferably from 1380° F. to 1420 F., enable unexpectedly superior yields of $C_6+$hydrocarbons at a given octane level compared to $CoO$-$MoO_3$ catalyst compositions calcined at temperatures falling outside of this range, as well as conventional alumina-supported $MoO_3$ hydroforming catalyst. The calcining of the catalyst composition may be advantageously effected in an oxidizing atmosphere, for instance air, for a period of at least one hour and preferably for 1½ to 4 hours.

In practicing the hydroforming process of the present invention, a hydrocarbon fraction is contacted with the supported $CoO$-$MoO_3$ catalyst in the presence of from about 500 to about 8,000 s.c.f. of hydrogen per barrel of hydrocarbon feed at a temperature from about 700° F. to about 1,000° F., preferably from about 800° F. to 950° F., and at a pressure of from about 50 to about 1,000 p.s.i.g. preferably 100 to 500 p.s.i.g. The space velocity at which the contacting is effected may advantageously vary from about 0.20 to about 2.0 weight of liquid feed/hr./weight of catalyst (w./hr./w.), although space velocities within the range of 0.3 to 1.3 w/hr./w. are most preferred. The catalyst is preferably maintained in a fluidized state during contacting with the liquid hydrocarbon feed. For this purpose, the supported cobalt oxide-molybdenum oxide catalyst is advisably employed in the form of microspheres having diameters of from about 20 to about 100 microns.

In addition to the advantages previously noted, the supported CoO-MoO₃ catalyst utilized in the present invention enables the hydroforming process to be carried out at relatively low pressures without significant increase in coke formation. The use of lower operating pressures, e.g. 100 to 300 p.s.i.g., results in further increases in the yield of $C_6+$ liquid hydrocarbons The preferred hydrocarbon feedstock employed in the hydroforming process is a hydrocarbon fraction boiling in the gasolene range, i.e. 185° F. to 450° F. For instance, the feedstock may be thermally or catalytically cracked naphtha, virgin naphtha, coker naphtha, Fischer-Tropsch naphtha, or mixtures thereof, with virgin naphtha being preferred. The present process is also useful, however, in dehydrogenating dicyclic naphthene feeds boiling within the range of 400° F. to 500° F., such as kerosene, to produce dicyclic aromatic hydrocarbons.

Regeneration of the catalyst composition may be suitably accomplished by combusting carbonaceous contaminants deposited thereon as a result of the hydroforming process. In accordance with one suitable regeneration procedure, the spent catalyst is contacted with air at a temperature of 1,000° F. to 1300° F., e.g. 1125° F. It should be noted that the CoO-MoO₃ catalyst compositions utilized in the invention have improved stabilities compared to conventional molybdenum oxide on alumina hydroforming catalyst. The tendency of the molybdenum component to sublime upon regeneration is inhibited by the cobalt oxide,, and the activity of the catalyst is thus maintained for a relatively longer period of time.

The invention will now be further described with reference to the following example, which is presented solely for the purpose of illustration and should not be interpreted as limiting the invention.

In each of the runs of this illustration, a virgin naphtha feedstock showing the inspection set forth in table, below, was hydroformed by conventional fluid bed techniques at a temperature of 870° F. and a pressure of 200 p.s.i.g. and at a space velocity of 0.7 in the presence of 2500 s.c.f. of hydrogen per barrel of liquid feed.

TABLE 1

*Feedstock inspection*

| | |
|---|---|
| ° API gravity | 54.1 |
| ASTM distillation | |
| IBP ° F | 218 |
| 10% ° F | 244 |
| 20% ° F | 250 |
| 30% ° F | 258 |
| 40% ° F | 264 |
| 50% ° F | 271 |
| 60% ° F | 278 |
| 70% ° F | 288 |
| 80% ° F | 298 |
| 90% ° F | 315 |
| End point ° F | 370 |
| Recovery percent | 98.0 |
| Residue do | 1.0 |
| Dry point | 332 |
| K factor | 11.80 |

For the purpose of control, a conventional catalyst composition of 11% MoO₃ on a gamma-alumina support and calcined at a temperature of 1150° F. was employed as the hydroforming catalyst.

In each of the other runs, the catalyst employed was a composition of 13.2% MoO₃; 3.67% CoO and 83.13% gamma-alumina. The CoO-MoO₃ catalysts differed only by the respective temperatures at which they were subjected to calcining. In each case, calcining was accomplished in the presence of air for two (2) hours.

The $C_6+$ selectivity of each of the alumina-supported CoO-MoO₃ catalysts was determined at constant octane level by the equation:

$C_6+$selectivity=$C_6+$vol. percent yield from CoO-MoO₃ cat. minus $C_6+$vol. percent yield from 11% MoO₃ cat.

The $C_6+$selectivities of the CoO-MoO₃ catalysts are listed in Table 2, below, and are plotted versus their corresponding calcining temperatures in the appended figure. In the figure, positive $C_6+$selectivity values indicate improved $C_6+$liquid hydrocarbon yields compared to that obtained using the conventional 11% MoO₃ on alumina catalyst composition at constant octane level, while negative $C_6+$selectivity values indicate poorer yield.

TABLE 2

$C_6+$ *selectivities of 13.2% $MoO_3$; 3.67% CoO; 83.13% $\gamma$-$Al_2O_3$ catalyst calcined at various temperatures*

| Catalyst calcining temp. (° F.): | $C_6+$selectivity |
|---|---|
| 1150 | −6.6 |
| 1335 | −0.8 |
| 1360 | −0.4 |
| 1375 | +1.7 |
| 1380 | +2.9 |
| 1400 | +3.2 |
| 1425 | +1.0 |
| 1450 | −0.6 |
| 1475 | −1.1 |

It will be noted that the catalyst calcining temperatures utilized in the practice of the present invention, namely within the range of 1375° F. and 1425° F., provided unexpectedly superior hydroforming catalysts. Calcining temperatures falling just outside the stated range, i.e. 1360° F. and 1450° F., resulted in catalysts having poor $C_6+$ selectivity compared to the control alumina-supported MoO₃ composition.

It should also be noted that the CoO-MoO₃ catalyst calcined at a temperature of from 1375° F. to 1425° F. also possess excellent activities and stabilities. Thus, it was determined that at constant hydroforming temperatures and octane level, the catalyst utilized in the present invention would enable space velocities of from 1.65 to 1.92 times as great as the space velocity enabled by the control 11% MoO₃ on alumina composition. Furthermore, high temperature aging tests conducted at 1228° F. for 30 days indicated that the surface area of the CoO-MoO₃ catalyst calcined at 1400° F. increased from 135 m.²/g. to 136 m.²/g., while the surface area of the MoO₃ on alumina catalyst decreased from 370 m.²/g. to about 226 m.²/g.

While the invention has been described above in connection with certain preferred embodiments thereof it will be understood by those skilled in the art that various changes and modifications may be made without departing from the spirit and scope of the invention as expressed in the appended claims.

Therefore, we claim:

1. A hydroforming process which comprises subjecting a liquid hydrocarbon fraction boiling within the range of 185° F. to 450° F. to hydroforming conditions including a temperature between about 800 and 950° F., a pressure between about 100 and 500 p.s.i.g. and a weight space velocity between about 0.2 and about 2.0 in the presence of between about 500 and about 8,000 standard cubic feet of hydrogen per barrel of hydrocarbon feed and a fluidized catalyst previously calcined at a temperature of 1375 to 1425° F., such catalyst consisting essentially of cobalt oxide and molybdenum oxide upon an alumina support.

2. The process of claim 1 in which the weight ratio of cobalt oxide to molybdenum oxide in said catalyst is from about 0.2 to about 0.4, the sum of the weights of cobalt and molybdenum oxides is from 6 to 20 percent of the total weight of the catalyst and the alumina support is gamma alumina.

3. The process of claim 2 in which the catalyst is calcined in an oxidizing atmosphere for a period of at least one hour.

References Cited

UNITED STATES PATENTS

| 2,393,288 | 1/1946 | Byrns | 208—46 |
| 2,890,162 | 6/1959 | Anderson et al. | 208—136 |
| 3,193,348 | 7/1965 | Mooi | 208—136 |

FOREIGN PATENTS 822,198  10/1959  Great Britain.

DELBERT E. GANTZ, *Primary Examiner.*

H. LEVINE, *Assistant Examiner.*